(12) United States Patent
Willette et al.

(10) Patent No.: US 10,509,377 B2
(45) Date of Patent: Dec. 17, 2019

(54) SYSTEM FOR MONITORING AND CONTROLLING INDOOR AIR QUALITY

(71) Applicant: Triatomic Enviromental, Inc., Jupiter, FL (US)

(72) Inventors: Christopher C. Willette, Jupiter, FL (US); Christopher Lee Miller, Boynton Beach, FL (US)

(73) Assignee: Triatomic Environmental, Inc., Jupiter, FL (US)

( * ) Notice: Subject to any disclaimer, the term of this patent is extended or adjusted under 35 U.S.C. 154(b) by 103 days.

(21) Appl. No.: 15/331,315

(22) Filed: Oct. 21, 2016

(65) Prior Publication Data

US 2017/0130981 A1 May 11, 2017

Related U.S. Application Data

(60) Provisional application No. 62/245,060, filed on Oct. 22, 2015.

(51) Int. Cl.
*G05B 15/02* (2006.01)
*F24F 3/16* (2006.01)

(52) U.S. Cl.
CPC ...... *G05B 15/02* (2013.01); *F24F 2003/1667* (2013.01)

(58) Field of Classification Search
CPC ........ F24F 11/0017; F24F 11/30; F24F 11/52; F24F 11/56; F24F 11/57; F24F 11/58; F24F 11/77; F24F 2003/1667; F24F 2110/10; F24F 2110/50; F24F 2110/64; F24F 2110/66; F24F 2110/74; F24F 2130/30
See application file for complete search history.

(56) References Cited

U.S. PATENT DOCUMENTS

| | | | |
|---|---|---|---|
| 5,121,324 A | 6/1992 | Rini et al. |
| 5,679,908 A | 10/1997 | Pinnow et al. |
| 5,878,245 A | 3/1999 | Johnson et al. |
| 5,903,139 A | 5/1999 | Kompelien |
| 7,454,269 B1 | 11/2008 | Dushane et al. |
| 8,086,407 B2 | 12/2011 | Chan et al. |

(Continued)

FOREIGN PATENT DOCUMENTS

EP 2028454 2/2009

*Primary Examiner* — Yuhui R Pan
(74) *Attorney, Agent, or Firm* — McHale & Slavin, P.A.

(57) ABSTRACT

An air quality monitoring and management system adapted to be mounted between an existing thermostat and a wall in which the thermostat was previously mounted, or directly at the HVAC system. The air quality monitoring and management system contains various wires for connecting to both a thermostat and HVAC system, thereby effectively intercepting the signal between the thermostat and HVAC system. The air quality monitoring and management system includes air quality measuring sensors, a housing for mounting between the wall and thermostat, and a controller that supplies electrical signals to the HVAC system through use of the aforementioned wires to supplement the control of the HVAC fan in conjunction with the thermostat to help increase air flow in the affected area. The air quality monitoring and management system may include an air quality management controller mounted to an HVAC air handling unit, and wirelessly connected to sensors.

22 Claims, 12 Drawing Sheets

(56) References Cited

U.S. PATENT DOCUMENTS

| | | |
|---|---|---|
| 8,146,376 B1 | 4/2012 | Williams et al. |
| 9,593,861 B1 * | 3/2017 | Burnett .................... F24F 11/08 |
| 2006/0097063 A1 | 5/2006 | Zeevi |
| 2006/0158051 A1 | 7/2006 | Bartlett et al. |
| 2012/0125592 A1 | 5/2012 | Fadell et al. |
| 2012/0193437 A1 | 8/2012 | Henry, Jr. et al. |
| 2012/0199660 A1 | 8/2012 | Warren et al. |
| 2012/0221150 A1 * | 8/2012 | Arensmeier ....... G05B 23/0224 700/276 |
| 2016/0116181 A1 * | 4/2016 | Aultman .............. F24F 11/0017 700/276 |

\* cited by examiner

SYSTEM FOR MONITORING AND CONTROLLING INDOOR AIR QUALITY

CROSS REFERENCE TO RELATED APPLICATION

In accordance with 37 C.F.R. 1.76, a claim of priority is included in an Application Data Sheet filed concurrently herewith. Accordingly, the present invention claims priority under 35 USC 119(e) to the U.S. Provisional Application 62/245,060, filed on Oct. 22, 2015, entitled "SYSTEM FOR MONITORING AND CONTROLLING INDOOR AIR QUALITY", the contents of which are herein incorporated by reference.

FIELD OF THE INVENTION

The present invention is related to systems and methods for controlling air quality; to systems and methods for controlling air quality using pre-existing heating, ventilation and air conditioning (HVAC) systems; and more particularly, to an indoor air quality management system and methods of managing indoor air quality, configured to interface with pre-existing HVAC hardware or electrical components, and further adapted to measure at least one gaseous contaminant, such as volatile organic compounds.

BACKGROUND OF THE INVENTION

Recent studies have shown that the level of invisible airborne organic chemical and odor contaminates, as well as ozone and other oxidant related contaminates, in our indoor air is generally two to five times higher than the levels found outdoors. Potentially harmful contaminates known as volatile organic compounds (VOCs) are a large group of carbon-based chemicals that easily evaporate at room temperature. While most people can smell high levels of some volatile organic compounds, other volatile organic compounds have no odor. Odor does not indicate the level of risk from inhalation of this group of chemicals. There are thousands of different volatile organic compounds produced and used in our daily lives. Some common examples include: acetone, benzene, ethylene glycol, formaldehyde, methylene chloride, perchloroethylene, toluene and xylene. Volatile organic compounds are often released from products such as building materials, carpets, adhesives, upholstery fabrics, vinyl floors, composite wood products, paints, varnishes, sealing caulks, glues, carpet cleaning solvent, home care products, air fresheners, air cleaners that produce ozone, cleaning and disinfecting chemicals, cosmetics, cigarette/cigar smoke, fireplaces, fuel oil, gasoline, moth balls, and vehicle exhaust. Daily activities that release volatile organic compounds include: cooking, dry cleaning clothes, carpet cleaning, household cleaning, hobbies, crafts, newspapers, magazines, non-electric space heaters, photocopiers, smoking, stored paints and chemicals, and wood burning stoves.

The health risks from inhaling any chemical depends on how much of the chemical is in the air, and how long and how often a person inhales the chemical. Scientists look at short-term (acute) exposures as an exposure between a period of hours to a period of days, or long-term (chronic) exposures as years to even a lifetime. Breathing low levels of volatile organic compounds for long periods of time may increase the risk of health problems for some people. Several studies suggest that exposure to volatile organic compounds may make symptoms worse in people who have asthma or are particularly sensitive to chemicals. Short-term exposure (acute) to high levels of volatile organic compounds may cause eye, nose and throat irritation, headaches, nausea, vomiting, dizziness or worsening of asthma symptoms. Long-term exposure (chronic) to high levels of volatile organic compounds create an increased risk of cancer, liver damage, kidney damage, and central nervous system damage.

Thus, a need exists for removing various damaging pollutants, such as volatile organic compounds and ozone and other oxidant based contaminates, from our air supplies.

SUMMARY OF THE INVENTION

The present invention is directed to an air quality monitoring and management system that is adapted to be mounted between an existing thermostat and a wall in which the thermostat was previously mounted. The air quality monitoring and management system contains various wires for connecting to both a thermostat and HVAC system, thereby effectively superimposing a signal on control wires that may operate components of the HVAC system, such as the fan, independently of the thermostat. The air quality monitoring and management system includes air quality measuring sensors, a housing for mounting between the wall and thermostat, and a controller that supplies electrical signals to the HVAC system through use of the aforementioned wires to supplement the control of the HVAC fan in conjunction with the thermostat to help increase air flow in the affected area. Alternatively, the air quality monitoring and management system may include an air quality management controller mounted to the HVAC system, particularly the HVAC air handling unit, and operatively coupled to a sensing unit or other sensors through wires or wireless technology.

Accordingly, it is an objective of the present invention to provide systems and methods for controlling air quality.

It is a further objective of the present invention to provide systems and methods for controlling air quality that interface with various components of air conditioning systems.

It is yet another objective of the present invention to provide systems and methods for controlling air quality that include a device that monitors indoor air quality and controls an environment by interfacing with existing environmental control devices.

It is a further objective of the present invention to provide systems and methods for controlling air quality that include a device that monitors indoor air quality and controls an environment by using sensors to measure air contaminants.

It is a further objective of the present invention to provide systems and methods for controlling air quality that include a device that monitors indoor air quality and controls an environment by using at least one sensor configured to measure gas based air contaminants.

It is a further objective of the present invention to provide systems and methods for controlling air quality that are configured to breakdown or adsorb a variety of gases.

It is a further objective of the present invention to provide systems and methods for controlling air quality that are configured to filter gases outside a predetermined area through the use of an air exchanger.

It is a further objective of the present invention to provide systems and methods for controlling air quality that include a device that monitors indoor air quality and controls an environment by at least one sensor to measure volatile organic compound (VOCs) contaminants or ozone ($O_3$), or other oxidant based contaminants.

It is yet another objective of the present invention to provide systems and methods for controlling air quality that include a device that monitors indoor air quality and controls an environment by using sensors to measure air quality, and which interface with and control functioning of an air condition system fan or air exchanger based on the levels of air quality as measured by the sensors.

It is a still further objective of the invention to provide systems and methods for monitoring and controlling air quality that includes at least sensors, a control unit/data processor, and air filtration mechanisms.

It is a further objective of the present invention to provide systems and methods for monitoring and controlling air quality that includes sensors, a control unit/data processor, and light activated catalyst air filtration for removal of VOCs or ozone.

It is a further objective of the present invention to provide systems and methods for monitoring and controlling air quality that includes sensors, a control unit/data processor, and physical barrier air particle filters.

It is a further objective of the present invention to provide systems and methods for monitoring and controlling air quality that includes sensors, a control unit/data processor, light activated catalyst air filtration, and physical barrier air particle filters.

It is a still further objective of the invention to provide systems and methods for monitoring and controlling air quality which include an air quality management controller mounted to the HVAC system, particularly the HVAC air handling unit, and operatively coupled to sensing unit or other sensors.

It is a still further objective of the invention to provide systems and methods for monitoring and controlling air quality which include an air quality management controller mounted to the HVAC system, particularly the HVAC air handling unit, and operatively coupled to a sensing unit or other sensors through wireless technology.

It is a still further objective of the invention to provide systems and methods for monitoring and controlling air quality which include an air quality management controller mounted to the HVAC system, particularly the HVAC air handling unit, and operatively connected to sensing unit or other sensors using wires.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention and illustrate various objects and features thereof.

DETAILED DESCRIPTION OF THE INVENTION

Figure 1:
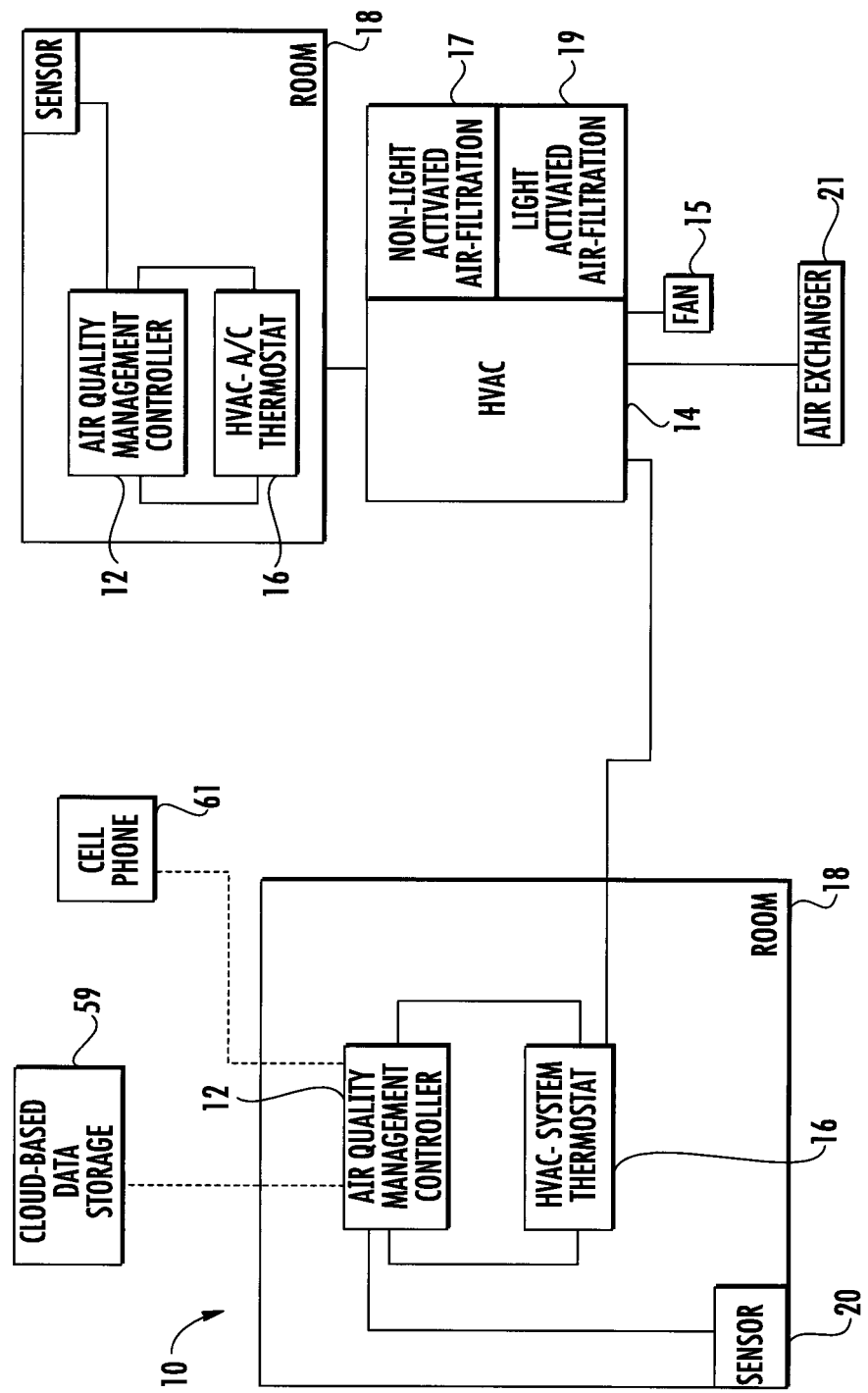
FIG. 1 is a schematic diagram of the components of an illustrative example of an air quality system in accordance with the present invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIG. 1, a schematic representation of an illustrative example of an air quality management system in accordance with the present invention is described. The system, referred to generally as an air quality management system 10, includes a device for controlling or managing air quality, referred to generally as an air quality management controller 12. The air quality management controller 12 is electrically coupled to a HVAC system 14 through a HVAC control device, illustrated herein as a HVAC or A/C thermostat 16. Each air quality management controller 12 is preferably located in an area, illustrated herein as a specific room 18, to allow monitoring and managing of the quality of air for a predetermined space. The air quality management system 10, therefore, may include one air quality management controller 12 in a room or a plurality of air quality management controllers 12, each air quality management controller 12 positioned in different rooms 18.

To aid in monitoring levels of contaminants in the room 18, one or more sensors 20 may be part of or electronically coupled, either via wires, wireless technology, or other communication technologies, such as near field communication (NFC) technology, to the air quality management controller 12. In this manner, air quality in one or more rooms can be controlled by measuring various air quality metrics and, based on predetermined levels or dynamic changes, one or more actions controlled by the air quality management controller 12 can be undertaken to modify air quality within the room.

Figure 2:
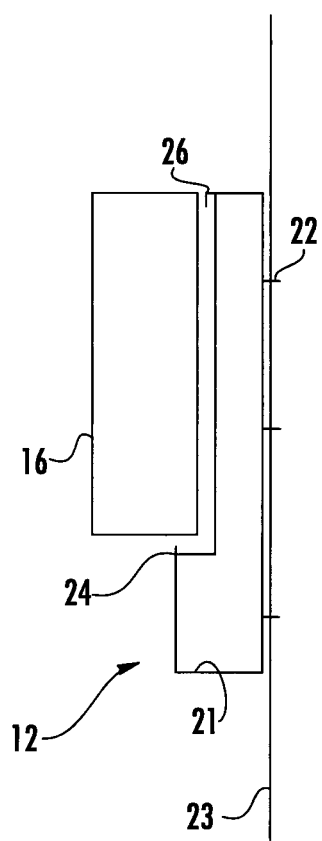
FIG. 2 is a schematic diagram illustrating the interaction of a pre-existing A/C thermostat with the air quality management controller component of the air quality system.

While the air quality management system 10 may include an A/C thermostat, the air quality management controller 12 may be configured to interact with pre-existing A/C thermostat units. As illustrated in FIG. 2, the air quality management controller 12 is secured to a wall 23 using a plurality of fastening members, illustrated herein as screws 22. Alternative fastening members may include chemical fastening, such as adhesives, or other fastening mechanisms, such as tape, loop and hook fasteners, magnets, or brackets. A pre-existing A/C thermostat 16 is secured to one or more portions of the air quality management controller body 21. In an illustrative embodiment, the air quality management controller body 21 contains several securing members, illustrated herein as metal fasteners such as machine screws 24, 26 designed to engage with one or more portions of the A/C thermostat, locking and securing it to the air quality management controller 12.

Figure 3:
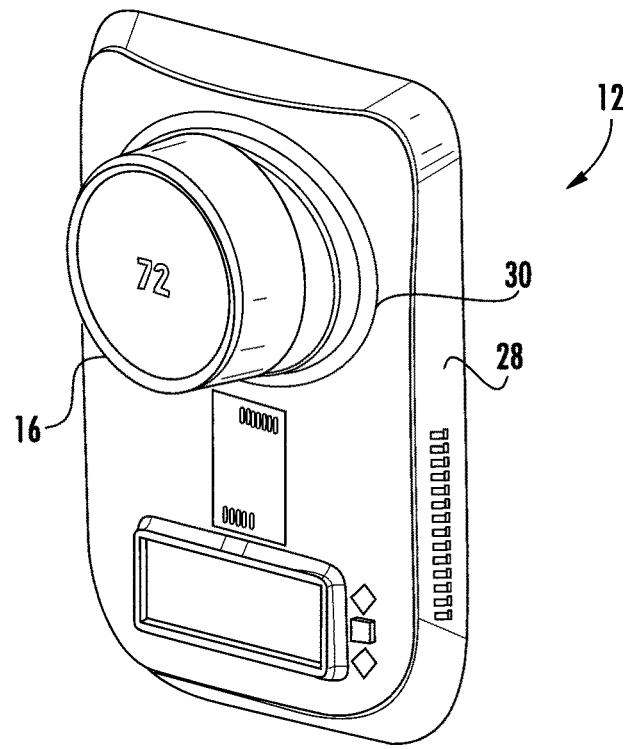
FIG. 3 is a front perspective view of an illustrative embodiment of an air quality management controller with an A/C thermostat.
Figure 4:
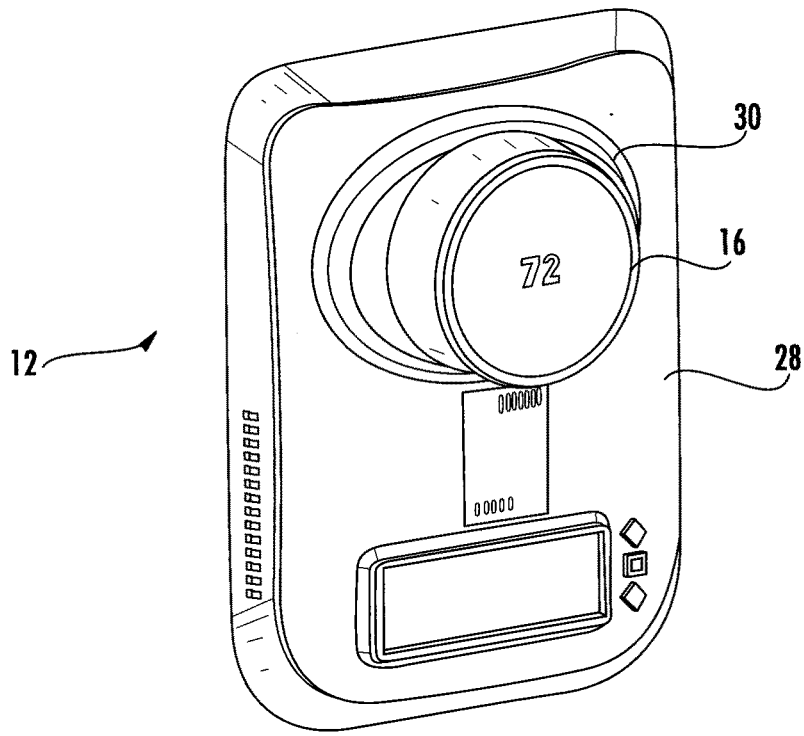
FIG. 4 is a side perspective view of an illustrative embodiment of an air quality management controller with an A/C thermostat.
Figure 5:
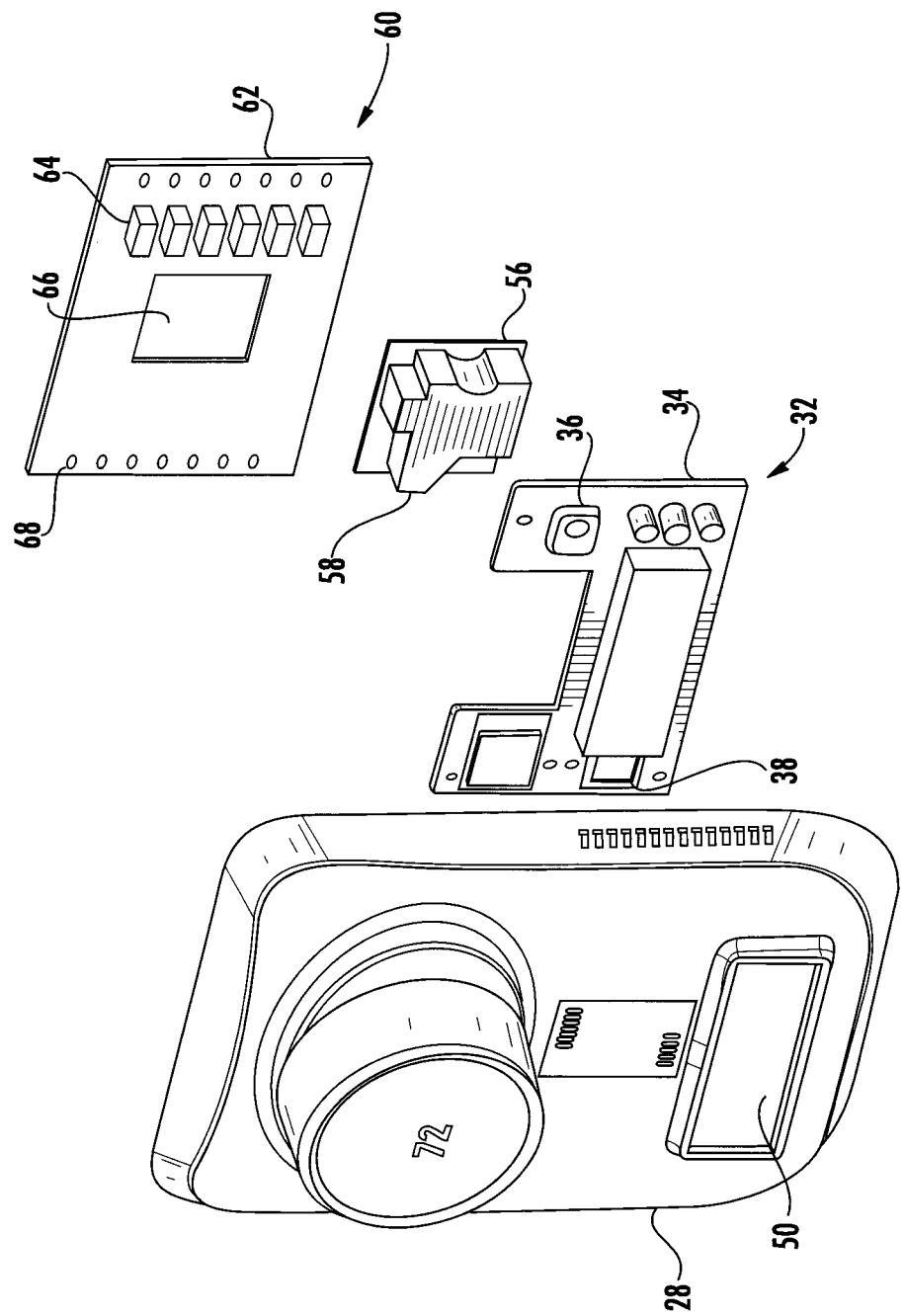
FIG. 5 is an exploded view of the air quality management controller with an A/C thermostat.
Figure 6:
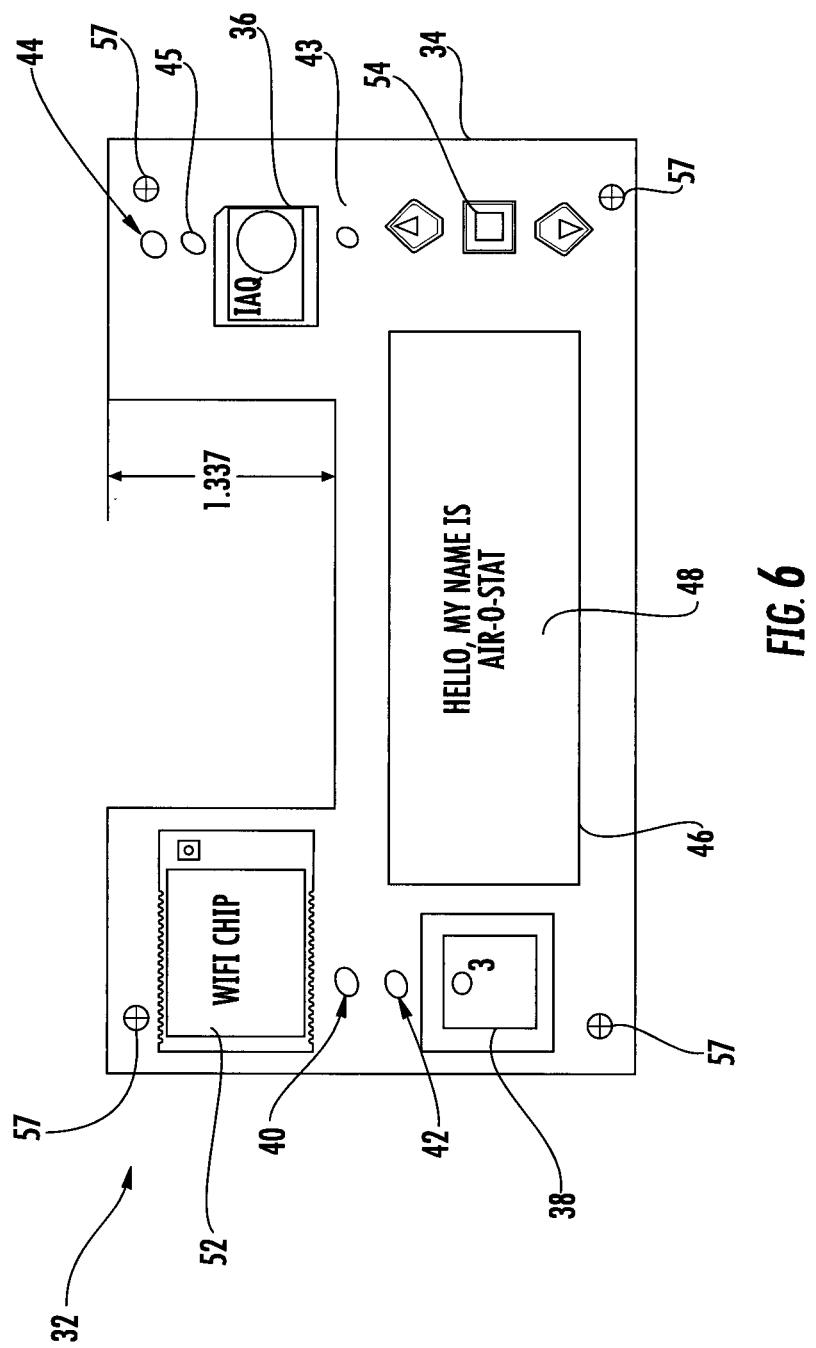
FIG. 6 is a schematic representation of an illustrative embodiment of an air quality sensing board.

Referring to FIGS. 3 and 4, an illustrative embodiment of the air quality management controller 12 with an A/C thermostat 16 is shown. The air quality management controller 12 contains a support structure, illustrated herein as a generally rectangular structure 28 sized and shaped to receive and secure one or more functional components. As illustrated, the generally rectangular structure 28 contains an opening 30 sized and shaped to allow the A/C thermostat 16 to fit and rest within. FIG. 5 is an exploded view showing the internal, functional components of the air quality management controller 12. An air quality sensing board 32 contains a support board 34 securing a plurality of sensors thereto. In a preferred embodiment, at least one sensor for measuring the presence or concentration of a gaseous material is used. For example, a VOC sensor 36 is included to provide a mechanism to detect one or more volatile organic compounds (VOCs), including alcohols, aldehydes, ketones, organic acids, amines, aliphatic and aromatic hydrocarbons. A second sensor, an ozone sensor 38, is configured to measure the presence or levels of, for example, Methane, Ammonia, Nitrogen Dioxide, Hydrogen Sulfide, Carbon Monoxide, Ozone, Sulfur Dioxide, Nitric Oxide (NO), Chlorine, n-Heptane. Additional sensors, such as a proximity sensor 40 configured to detect the presence of a nearby object, such as a person, with the purpose of determining occupancy of an area, an ambient light sensor 42 to detect levels of light within an area, a motion sensor 43, and a temperature/humidity sensor 44 may be secured to the support board 34, see FIG. 6. A particle sensor 45 may be used as well to detect the quantity and size of airborne particles, such as dust, pollen, dirt and other airborne particles within the predefined area.

A visual display unit, illustrated as an LCD screen 46 may be used to display visual communication 48 of words or pictures in order to visually display a particular message. The LCD screen 46 is sized and shaped to fit within the opening 50 of generally rectangular structure 28. To communicate wirelessly with other components, such as the thermostat 16, a wireless communication chip, illustrated herein as a Wi-Fi (a local area wireless computer networking technology that allows electronic devices to network) chip 52 may be used. While a Wi-Fi chip is shown, other wireless technology may be contemplated, including but not limited to Bluetooth (wireless technology standard for exchanging data over short distances) or Zigbee sensors (wireless communication technology, an IEEE 802.15.4 based specification for a suite of high level communication protocols used to create personal area networks with small, low power digital radios). Alternatively, wireless communication may be achieved using other radio frequency technology. A plurality of buttons 54 may be used to allow user interaction and setting of features and attributes that define various functions. Alternatively, the visual display unit may be configured for touch screen capability and functioning. The support board 34 may be secured to other components through insertion of fastening members, such as screws, through openings 57.

A control unit support structure 56 holds a control unit, such as a central processing unit or microprocessor 58 having permanent memory for storing instructions for the operation and control of the air quality management controller 12. The central processing unit or microprocessor 58 may also contain working memory. The central processing unit or microprocessor 58 allows for the air quality management controller 12 to provide and utilize active and predictive control functions that help reduce electrical usage and system wear/usage, and increase the level of air quality. Control functions may include a plurality of industrial and custom control methodologies/algorithms that may include, but are not limited to, bang/bang control, proportional-integrative-derivative control, and custom control algorithms. Inputs from all the sensors may be accepted by the central processing unit or microprocessor 58.

The central processing unit or microprocessor 58 may be designed to adjust function according to a pre-defined program, such as adjusting the functioning (i.e. turning on/off an A/C system fan, or venting a room to the outside environment) of the air quality management controller 12 based on the information obtained from the sensors, preset limits and programmed instructions. The algorithms used by the central processing unit or microprocessor 58 may be configured to: 1) auto calibrate the system over time to maintain relatively accurate air quality levels, 2) detect anomalous events and react to them (by turning the system off in case of fire or noxious gas detection), 3) monitor total time HVAC fan has been running and, if no improvement in air quality has been realized, will alert the user that a fault exists, 4) utilize air quality data saved over time to create predictive responses to low air quality based on events or time, 5) illuminate lights or other displays to show colors or light intensities correlating to levels of air quality, faults, successes or other information, 6) display air quality information onto a graphical display through graphics or text based formats, 7) react to inputs from user button presses, or 8) combinations thereof. Information collected by the central processing unit or microprocessor 58 may be saved in internal memory on the device or may be transmitted to a cloud-based storage (see 59, FIG. 1) location or both. This information may be used to develop smarter algorithms, allow predictive behavior, crowd sourced or based air cleaning metrics, or to allow cloud based control (i.e. all information is read to a cloud and processed, with only commands being sent down to the device). The air quality management controller 12 may be configured to communicate with external data sources, such as weather data or local air quality data. The air quality management controller 12 may communicate to external websites or governmental sources, such as news weather sites or federal government agency websites, via the internet or application programming interface (API). This data may be obtained by the system continuously pinging weather sites or air quality sites so that, if the outdoor air quality is determined to be worse than the indoor air quality, venting or bringing outdoor air into the room would be prevented. The air quality management controller 12 may also communicate with cell phone applications (see 61, FIG. 1).

An intercept member 60 (FIG. 5) includes a control and intercept support structure 62 having a plurality of relays 64. Opening 66 allows one or more electrical components, such as wires, to pass through. The control and intercept support structure 62 may also contain one or more lights, such as LEDs 68. The LEDs 68 can act as indicators (through changing colors) for operational status, such as for example, communication/no communication with one or more components of the system, i.e. the Wi-Fi chip has a strong signal to the thermostat, battery status, or for an indication of high or low levels of a contaminant being sensed within a room. A set of outputs, such as wiring terminals or contacts that are coupled to hard wires extending into HVAC systems and to the thermostat, may be used.

The air quality management controller 12 is preferably designed to mount directly behind a thermostat 16 onto the wall or any surface. Electrical connections, i.e. electrical wires 74, from the A/C thermostat 16 pass through the opening 66 and connect to the A/C control wires. The air quality management controller 12 preferably uses two (the fan control wire and auxiliary control wire) of the typical control wires. The signal for these two wires is carried through the air quality management controller 12 and into the A/C thermostat 16 by using two extra wires. In this construction, the air quality management controller 12 functions as an additive control unit to the A/C thermostat 16. Moreover, the air quality management controller 12 does not intercept the functioning of the A/C thermostat 16 or interfere with the A/C thermostat 16 controls or commands.

Figure 7:
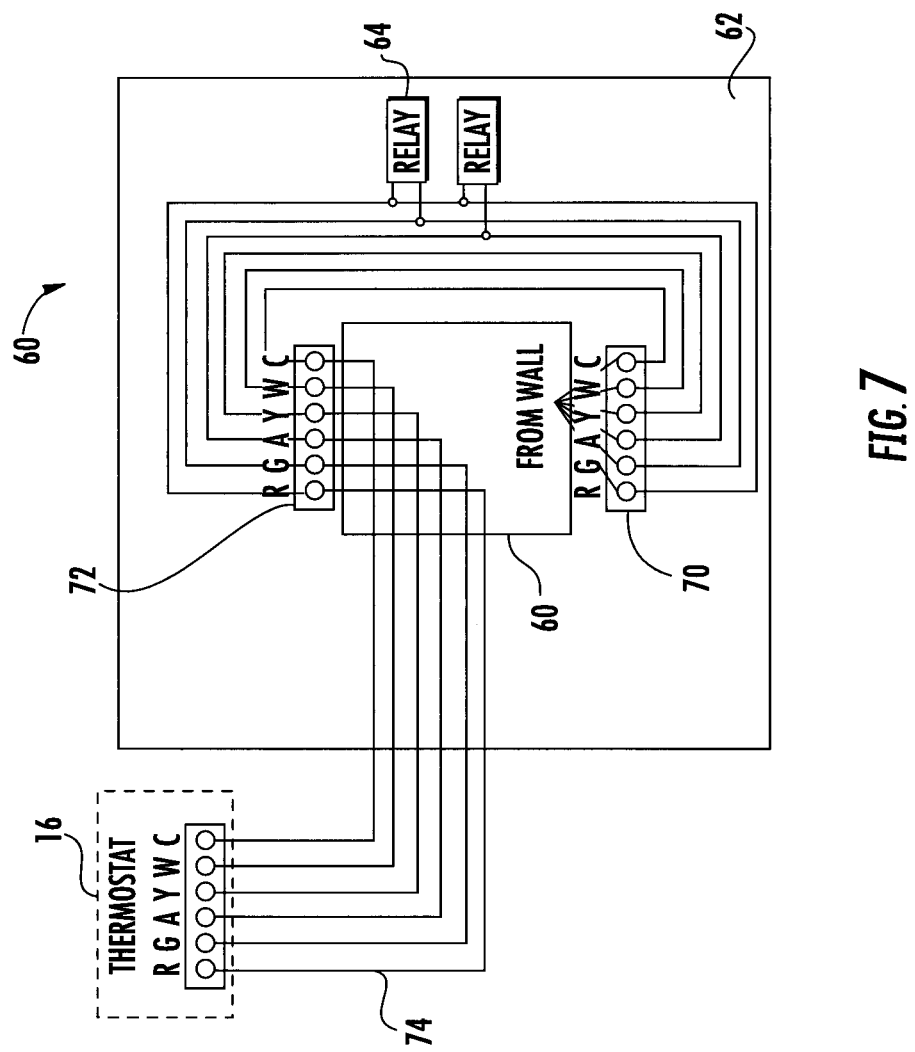
FIG. 7 is an illustrative wiring diagram of the air quality system.

FIG. 7 illustrates a physical connection scheme where control and power wires from the air handler unit are passed through an opening in a wall and are secured by one set of output terminal blocks 70 installed on the air quality management system control board 60 and control wires 74 from the thermostat 16 are passed through the opening 66 in the device and terminate at a separate set of input terminal blocks 72 mounted on the control board 60. Each terminal on the input terminal block 72 corresponds to an identical terminal on the output terminal block 70, and the signals will pass through unimpeded. Two signals connected to the input terminal blocks from the thermostat 16 may be monitored by inputs on a microcontroller or other monitoring device to determine the presence of a signal on those wires. Relays 64 may be used to provide controllable, parallel connections between the power and fan control signal wire and the power and auxiliary control wire. Light emitting diodes 68 may be mounted directly to the control board to provide a visual indication.

Figure 8:
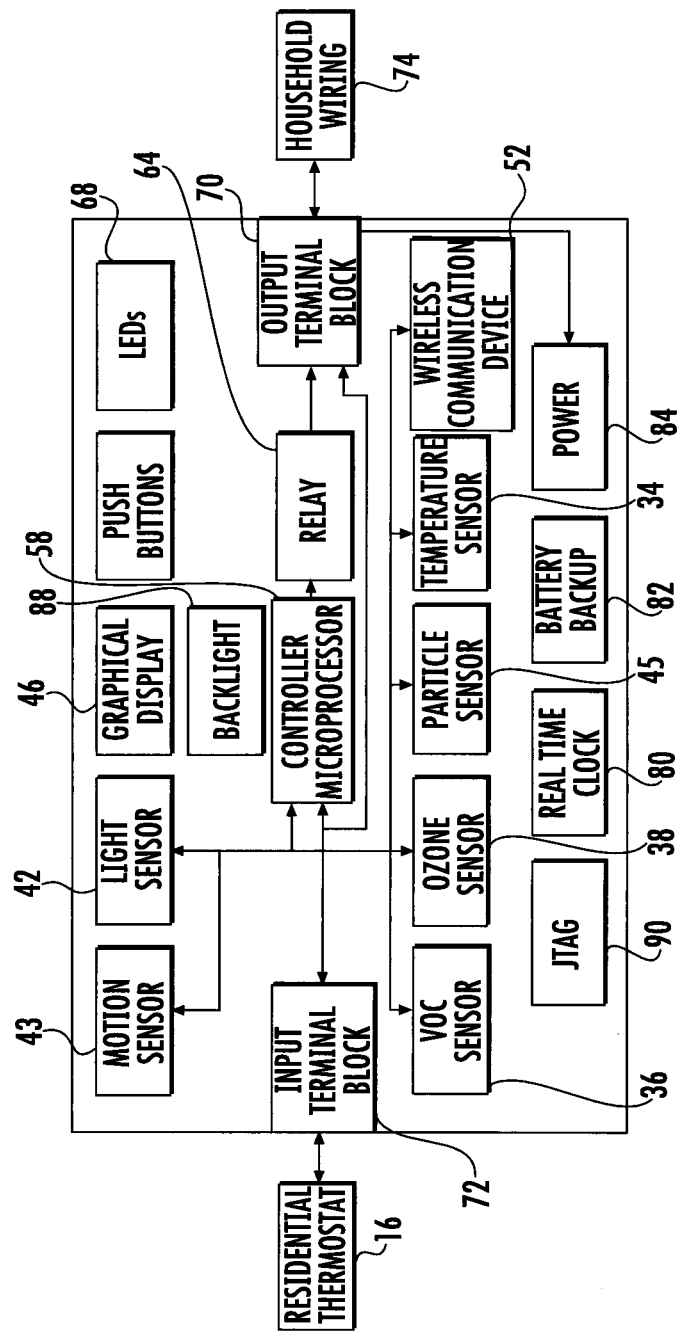
FIG. 8 is a program/logic flow chart of the air quality system.

FIG. 8 illustrates a program/logic flow chart and additional components of the air quality management controller 12, including a real time clock 80, a battery backup 82, a power button 84, back lighting 88, and JTAG protocol 90 for programming the control unit.

Figure 9:
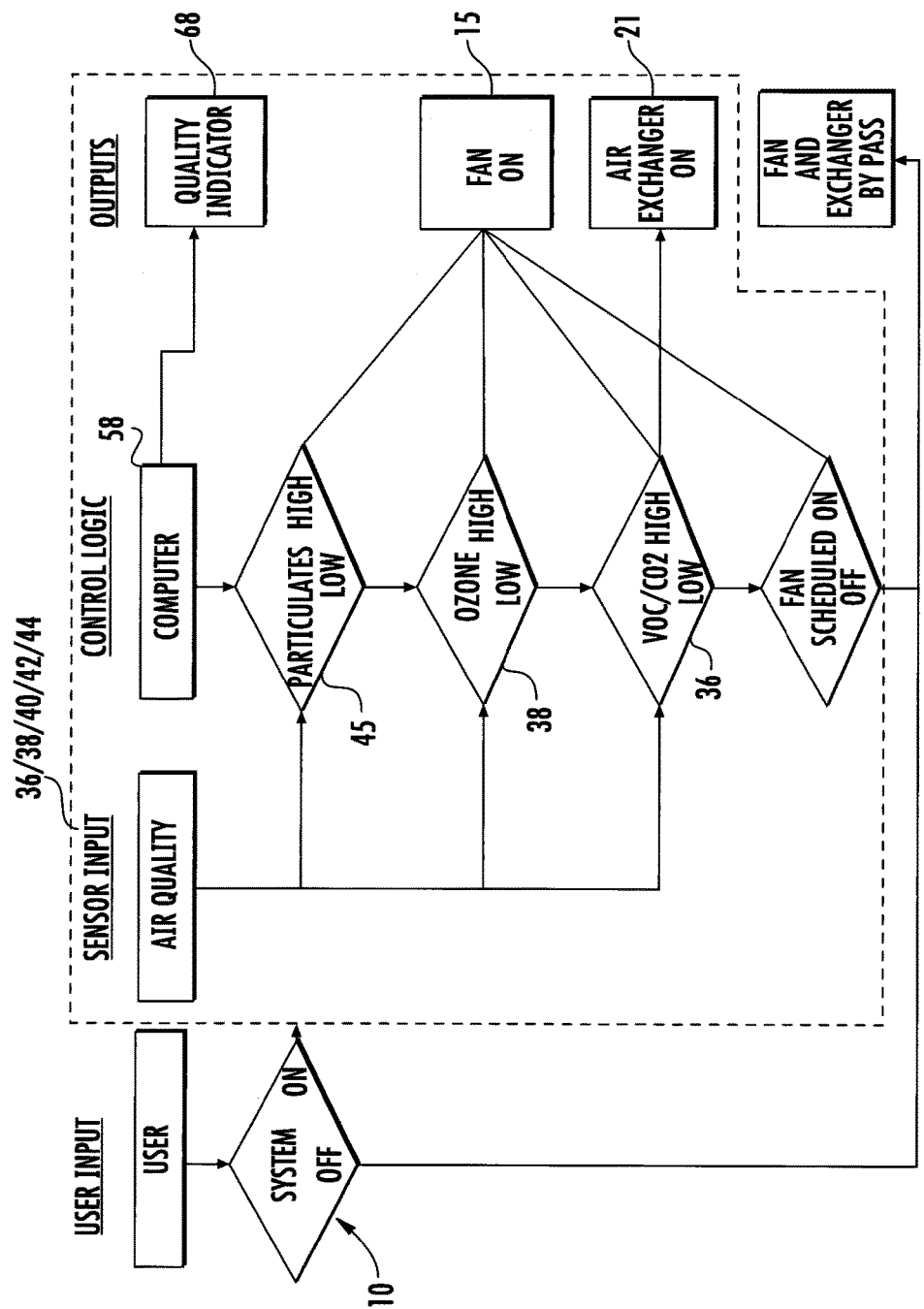
FIG. 9 is a schematic operational flow chart relating to the air quality system in accordance with the present invention.

In operation, the air quality management system 10 provides for an indoor air quality management scheme that uses a combination of sensors, data processing and control in combination with air purification structures, such as air filtration or light activated catalyst that interface with A/C units. The air quality management system 10 provides a mechanism to control the level of various air quality metrics. Because the air quality management controller 12 is designed to interface with pre-existing components of an A/C unit, the normal function of the A/C unit may not be disturbed. In the situation where sensor 36 detects high levels of VOCs, the air quality management controller 12 will switch on the HVAC fan 15 (see FIG. 1 or FIG. 9) to move air to portions of the system that can neutralize such contaminants. For example, the VOCs may be moved to interact with a non-light activated system 17 (air purification filters to trap various particles, allergens, dust) or a light activated air filtration system 19 of gas phase adsorber. Such light activated air filtration system may include a HVAC system having a light source, such as an ultraviolet light emitted by an ultraviolet light source, to break down captured volatile organic compounds into elemental carbon dioxide and water vapor, and to irradiate air moving past the ultraviolet light and surfaces to reduce contaminants, and an adsorptive photocatalytic oxidation device.

The ultraviolet light source may be positioned within a HVAC to expose the adsorptive photocatalytic oxidation device to ultraviolet light emitted by the ultraviolet light source. The adsorptive photocatalytic oxidation device may be an activated carbon honeycomb monolithic cell or other material that has gas phase adsorbing capabilities. The air purification system controls and reduces indoor related contaminates, such as volatile organic compounds, by first adsorbing the airborne contaminate into the adsorptive photocatalytic oxidation device, and then breaking the volatile organic compound contaminate down via a photocatalytic oxidation process to free up the adsorbing media to further absorb additional airborne contaminates.

The adsorptive photocatalytic oxidation device preferably includes a regenerative photocatalyst coating comprising a novel, two component composition which forms a new chemical molecule, referred to generally as an enhanced regenerative photocatalyst composition, with photocatalytic action, surface binding and antimicrobial properties. The enhanced regenerative photocatalyst composition comprises: 1) an organosilane, preferably an organosilane quaternary ammonium, and 2) a photocatalyst, such as titanium dioxide $TiO_2$. Other photocatalysts may include zinc oxide (ZnO), tungsten trioxide ($WO_3$), zirconium dioxide ($ZrO_2$), or cadmium sulfide (CdS). The composition is believed to be effective by utilizing one or more characteristics. The organosilane imparts positive charge on the composition. The positive charge attracts the negatively charged microbe or contaminate VOCs. The organosilane component is further believed to puncture and chemically kill the microbe and break down the contaminate VOCs. Finally, the titanium dioxide ($TiO_2$) is believed to reduce pathogens or contaminate VOCs through the reactive oxidative stress (ROS) process. In use, the media first adsorbs and holds the VOC chemicals into "sites" or holes in the carbon. The light then catalytically reacts via the $TiO_2$ catalyst on the surface and the UV light. The catalytic process then breaks down the held or captured chemical to an elemental form, thus freeing up the carbon site to adsorb once again.

If the VOCs levels are very high, the air quality management controller 12 may switch the fan 15 on, and an air exchanger 21 may be activated to move outside air into the room and inside air out of the room to reduce levels of the contaminant. Operation of a fan 15 and air exchanger 21 may also be provided for other high levels of contaminates, such as particles or ozone (see FIG. 9). Based on the levels of any contaminants measured, electrical signals from the air quality management controller 12 may be sent to the HVAC fan or air exchanger controller to circulate air throughout.

While the air quality management system 10 has been illustrated as being mountable in place of an existing A/C thermostat, with the thermostat being installed "over" the air quality management controller 12, such placement is not required. Alternatively, the air quality management controller 12 may be configured to be a wall mount unit. In this arrangement, the air quality management controller 12 would mount on the wall under or to any side of the A/C thermostat 16. The air quality management controller 12 that mounts to the wall would still connect to the A/C control wires, i.e. the A/C control, fan control, air exchanger control (AUX). In addition, the wall mounted air quality management controller 12 could attach to an existing A/C thermostat. Similar to described above, the wall mount version will be wired in line with and in between the A/C thermostat and the fan, air exchanger, power, ground controls associated with the HAVC system.

Figure 10:
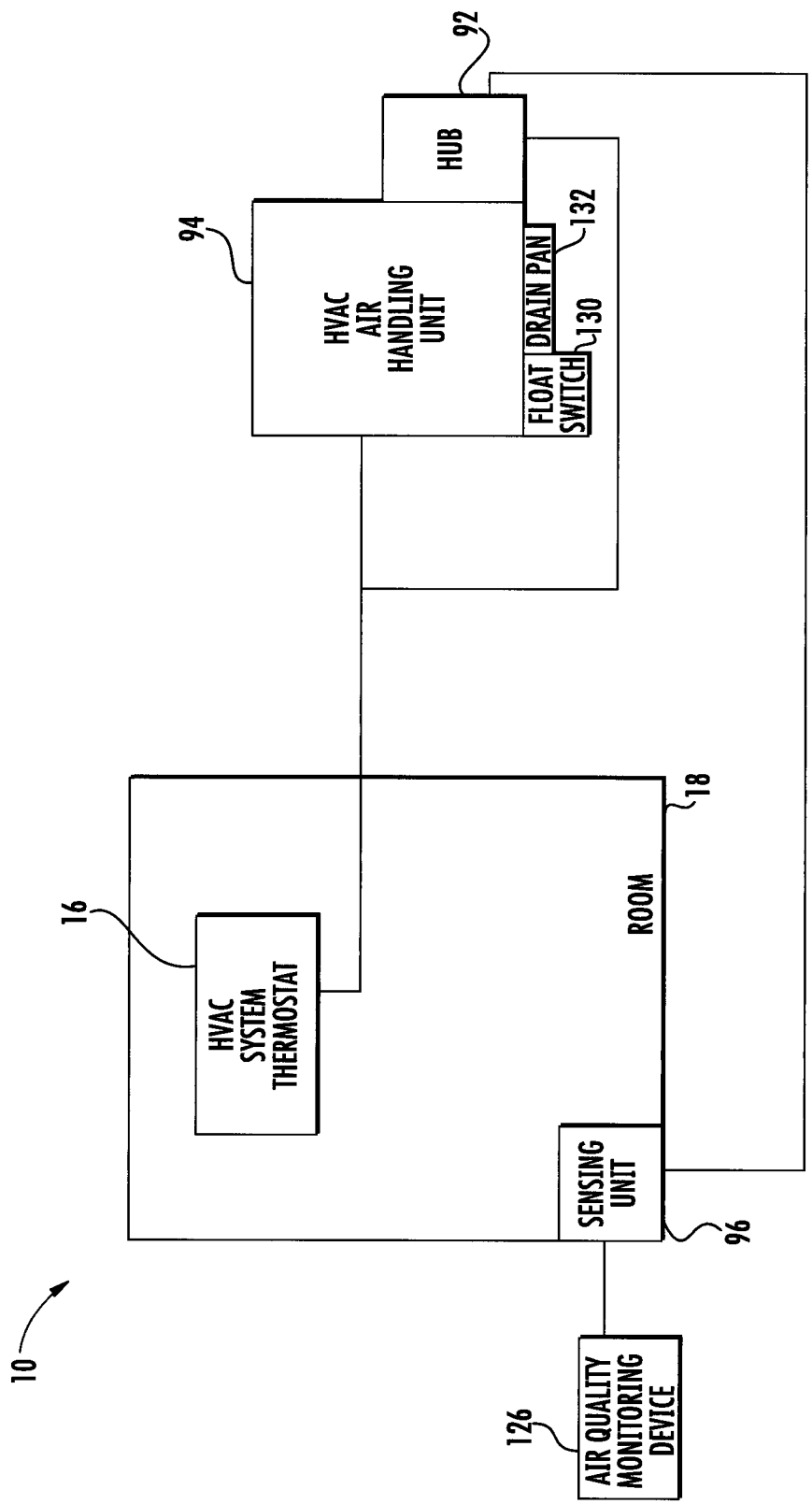
FIG. 10 is a schematic representation of the air quality management system which uses an air quality management controller mounted to the HVAC system.
Figure 11:
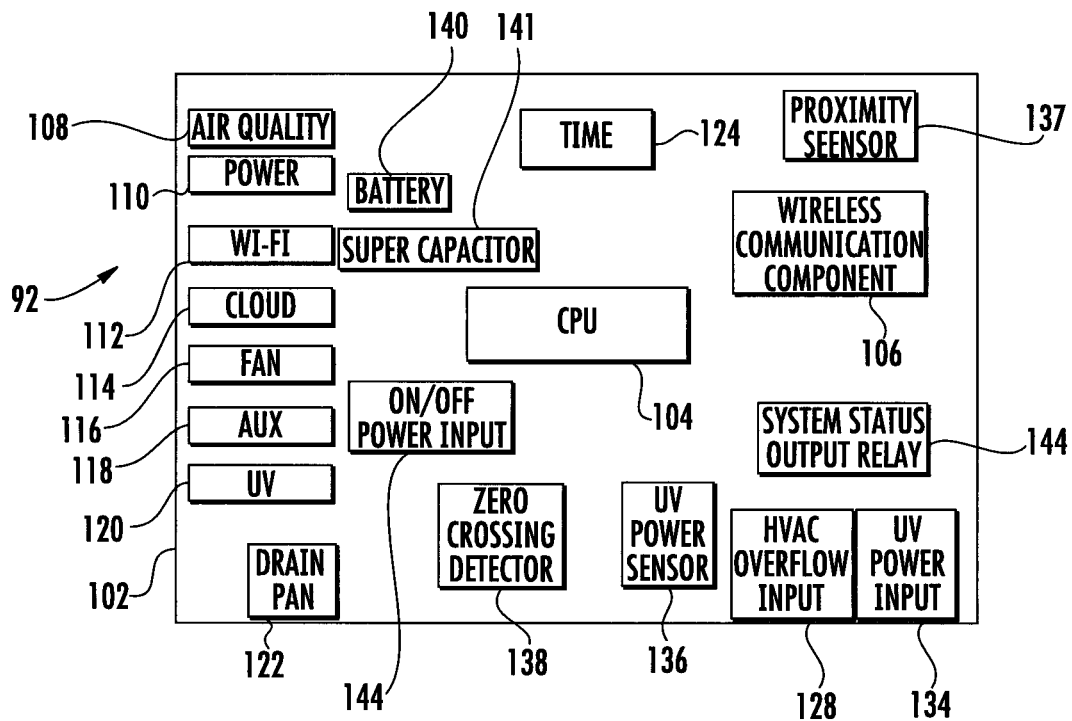
FIG. 11 is a schematic representation of the air quality management controller illustrated in FIG. 10.
Figure 12:
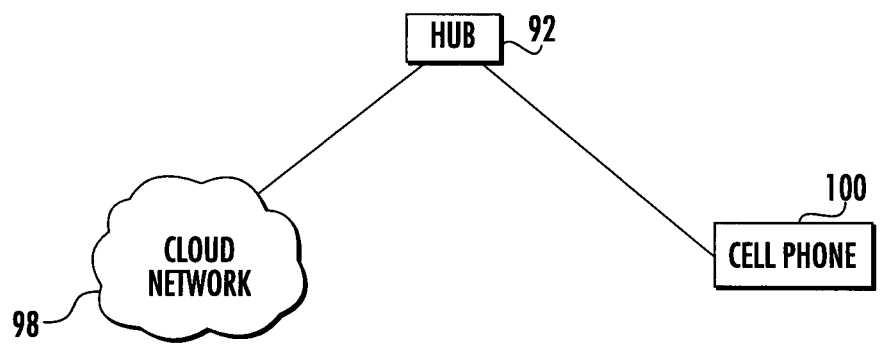
FIG. 12 illustrates the wireless communication of the air quality management controller illustrated in FIG. 10 with other electronic devices or networks.

FIGS. 10-12 illustrate the air quality management system 10 which uses an air quality management controller, referred to as hub 92, mounted to the HVAC system 14, particularly the HVAC air handling unit 94, and a sensing unit 96. The hub 92 is configured to intercept signal wires for controlling the fan of a HVAC system. The hub 92 may contain one or more components of the air quality management controllers described previously, such as any one or combination of features described in FIG. 8. In addition, hub 92 can be wired to the HVAC unit in same as described by FIG. 7. The hub 92 may be designed to intercept and control additional signals, such as signals to other components of the HVAC system, such as compressor, heater, air ventilation, and zone dampers. Preferably, the hub 92 connects wirelessly to the internet or directly to a secondary device through a Wi-Fi, Bluetooth, or other radio connection to receive data control. Sensing unit 96 may be configured to rest, free standing on a table or be mounted to a wall. The sensing unit 96 may contain one or more sensors for detecting various environmental factors associated with the room 18, such as temperature, humidity, VOCs, carbon dioxide, ambient light, motion, or other measurable room characteristics as described previously in the specification. Alternatively, the hub 92 may be wirelessly connected to one or more individual sensors, such as a VOC sensor, ozone sensor, temperature sensor, or a particulate sensor.

While FIG. 10 illustrates a single room, additional rooms 18 with additional HVAC system thermostats 16 and sensing units 96 may be used. The sensing unit 96 may be designed to send data wirelessly to the internet, or directly to a secondary device, such as the hub 92, to initiate an action based on the sensor data obtained. The air handling unit 94 is a typical large metal box containing known components, such as a blower, heating and cooling elements, filter racks or chambers, sound alternators, dampers, air filtration units, and other components known to one of skill in the art that help to regulate and circulate air as part of the HVAC system. The sensing unit 96 is placed in a room 18 which requires monitoring. The hub 92 may contain one or more of the same features, components, and functionality as the air quality management controller 12 described above. Because the air quality management controller, referred to as hub 92, is mounted to the HVAC air handling unit 94, it may also contain additional features.

FIG. 11 is a schematic illustration of an illustrative hub 92. Hub 92 functions as an air quality monitor and controller that switches a cluster of relays based on threshold values set in software relating to air quality of a predetermined area, i.e. a room 18. As described above, the hub 92 is an air handler mounted unit that communicates, preferably wirelessly, with the sensing unit 96 or one or more indoor quality sensors. In operation, when the sensing unit 96 or individual sensors register a declining air quality, the hub 92 receives a signal to re-circulate air within the space, i.e. room 18, through interaction with the control components of the HVAC system. The hub 92 may also be designed to monitor and communicate alert levels for key functions within the air handler 94, such as filter life, condensation level, UV light life. Communication of such status data may be provided to individual users or technicians through a cloud based network 98, see FIG. 12, or directly to a user, through, for example, a cell phone 100 using SMS text or other communication mechanisms.

The hub 92 may be designed to have a housing unit 102 configured to enclose and safeguard one or more structural components that make the hub 92 function. The hub 92 may function through the use of push buttons, or through the use of a touch screen technology. The housing unit 102 may enclose a central processing unit (CPU) 104, such as a microprocessor contained on an integrated chip configured to carry out the various functions of the hub 92. The CPU 104 can process network traffic inbound from the Internet and deliver outbound network traffic to the Internet utilizing, for example, a multi-layered networking protocol, such as TCP/IP. The CPU 104 may use/have memory, including both volatile and non-volatile memory, which stores program code executable by the CPU 104. The program code causes the CPU 104 to perform various steps as later described.

Hub 92 may contain a wireless communication protocol or component 106 which allows for wireless communication with nearby devices, phones, internet, for uploading information to a cloud based network, checking for update requests, and downloading new software updates. In addition to Wi-Fi, other wireless communication protocols such as Bluetooth, Zigbee, and SoW, may be used. The hub 92 may contain a plurality of displays: air quality display panel 108, power status 110, Wi- or other wireless connection status 112, Cloud network connection status 114, fan relay activation status 116, air exchanger control (AUX) status 118, UV light system status and/or lamp life status 120, drain pan fault status 122, duration of time functioning 124. The plurality of displays may be in the form of colored lights (LEDs) which indicate functionality, green meaning working, and red meaning not working.

The central processing unit (CPU) 104 is configured to allow hub 92 to perform various functions. Hub 92 is preferably designed to control the state, i.e. on/off, of the fan unit of the HVAC air handling unit 94 through the use of Boolean OR logic. This functionality allows the hub 92 to operate independently of the primary thermostat 16, but control the fan when required. In this manner, the hub 92 can turn on the fan even when the thermostat 16 has turned off the fan. Hub 92 may further be configured to monitor and alert a user of the air filter status. In an illustrative example, the hub 92 uses a wireless platform, such as Bluetooth low energy (BTLE) to communicate to a third party device that monitors air quality status. The air quality monitoring device may be part of the sensing unit 96, or may be an independent unit 126. As an illustrative example, the air quality monitoring device 126 operates by utilizing an internal battery powered sensor that measures the air flow rate through an air filter. The air quality monitoring device 126 may utilize memory and a programmable microcontroller to continually monitor the current airflow rate, comparing it to initial airflow rates stored within the memory. As the air filter is used over time, the filter traps a greater number of particles, resulting in reduced airflow. The air quality monitoring device 126 detects a threshold change in the airflow rate, triggering a signal to the hub 92. Once received by the hub 92, a notification message, sent via the internet or directly through a cell phone, is sent to the user.

Hub 92 may be used to alert a user of high condensate water prior to the mandatory HVAC air handling unit 94 shutdown. Hub 92 is designed to comprise an input 128 for an HVAC overflow sensor, such as a float switch. Hub 92 is preferably designed such that the float switch will be wired in series with the thermostat 16, thus preventing bypass of the float switch. When a HVAC system drain pan is empty, i.e. not filled with water, a float switch 130 (see FIG. 10) is operating in a normal state. Hub 92 monitors the normal energy state flowing through the float switch 130. Energy above a predetermined threshold indicates the float switch 130 is allowing energy from the HVAC to power the thermostat 16. If a drain pan 132 reaches a water level high enough to activate the float switch 130, hub 92 detects a drop in power and provides an emergency notification, letting the user know of the situation through a notification light, such as the drain pan fault status light 122, or through email or text notification.

Hub 92 may also be configured to monitor and alert the user of UV life. Hub 92 may contain a real time clock 124 as a time keeper. When a UV device is detected and determined to be working correctly, hub 92, through software, accumulates the time for each device and stores the information through, for example, an EEPROM (electrically erasable programmable read-only memory) array. Each UV device contains a recommended lifetime value. When the UV light has been operating for a time period of between 0% and 50% of its lifetime, a green LED may be used. When the device has been operating between 50% and 75% of its useful lifetime, a yellow light may be displayed. When the device has been operating between 75% and 100% of its useful lifetime, a red light may be displayed. At 100%, the red light may blink. Hub 92 may also be configured to monitor the power consumption of the UV devices. UV devices are wired in series through UV power monitoring inputs 134 that pass energy through power sensors 136. The hub 92 may contain a proximity sensor 1137 which wakes up the hub 92 after motion is detected.

Hub 92 may also be configured to monitor and alert a user of a no power fault condition of the HVAC air handling unit 94. Hub 92 contains a zero point crossing detector 138 that acts as a power sensor to detect when power is on or off. Each time A/C current changes direction, it changes from positive to negative (and vice versa), where it crosses the zero point and the voltage drops to zero. The zero point crossing detector 138 monitors this, sending the information to the CPU 104. The CPU 104 monitors the zero point crossing signal through an interrupt. If a power outage occurs, software stops all activity and immediately sends a pre-programmed notice to the cloud, or directly via text message. Hub 92 records the time the device was powered down and alerts the user. A battery 140 or super-capacitor 141 may be used to power the hub 92 long enough to store power down information and to alert a user or send data to the cloud.

Hub 92 is designed to digitally output data to other devices. For example, the levels detected by the one or more sensors, such as VOC/CO levels (parts per million), ozone levels (parts per billion), particulate levels (parts per million), temperature, and humidity values, may be transferred to a third party device. Additionally, hours remaining of a UV lamp, or fault detection (lamp fault, ballast fault, or lamp life expired fault) may be transferred to a third party.

In operation relative to measurement of air quality, the air quality management system 10 provides for an indoor air quality management scheme that uses a combination of sensors, data processing and control in combination with air purification structures, such as air filtration or light activated catalyst that interface with A/C units. The air quality management system 10 provides a mechanism to control the level of various air quality metrics. Because the hub 92 is designed to interface with pre-existing components of an A/C unit, the normal function of the A/C unit may not be disturbed. In the situation where sensing unit 96, or other independent sensors, detects high levels of contaminants, such as VOCs, ozone, etc., the hub 92 will switch on the HVAC fan or air exchanger to move air to portions of the system that can neutralize such contaminants. For example, the VOCs may be moved to interact with a non-light activated system (air purification filters to trap various particles, allergens, dust, see 17, FIG. 1) or a light activated air filtration system of gas phase adsorber (see 19, FIG. 1). Such light activated air filtration system may include a HVAC system having a light source, such as an ultraviolet light emitted by an ultraviolet light source, to break down captured volatile organic compounds into elemental carbon dioxide and water vapor, and to irradiate air moving past the ultraviolet light and surfaces to reduce contaminants, and an adsorptive photocatalytic oxidation device. Alternatively, the VOCs may be moved out of the room.

Figure 13:
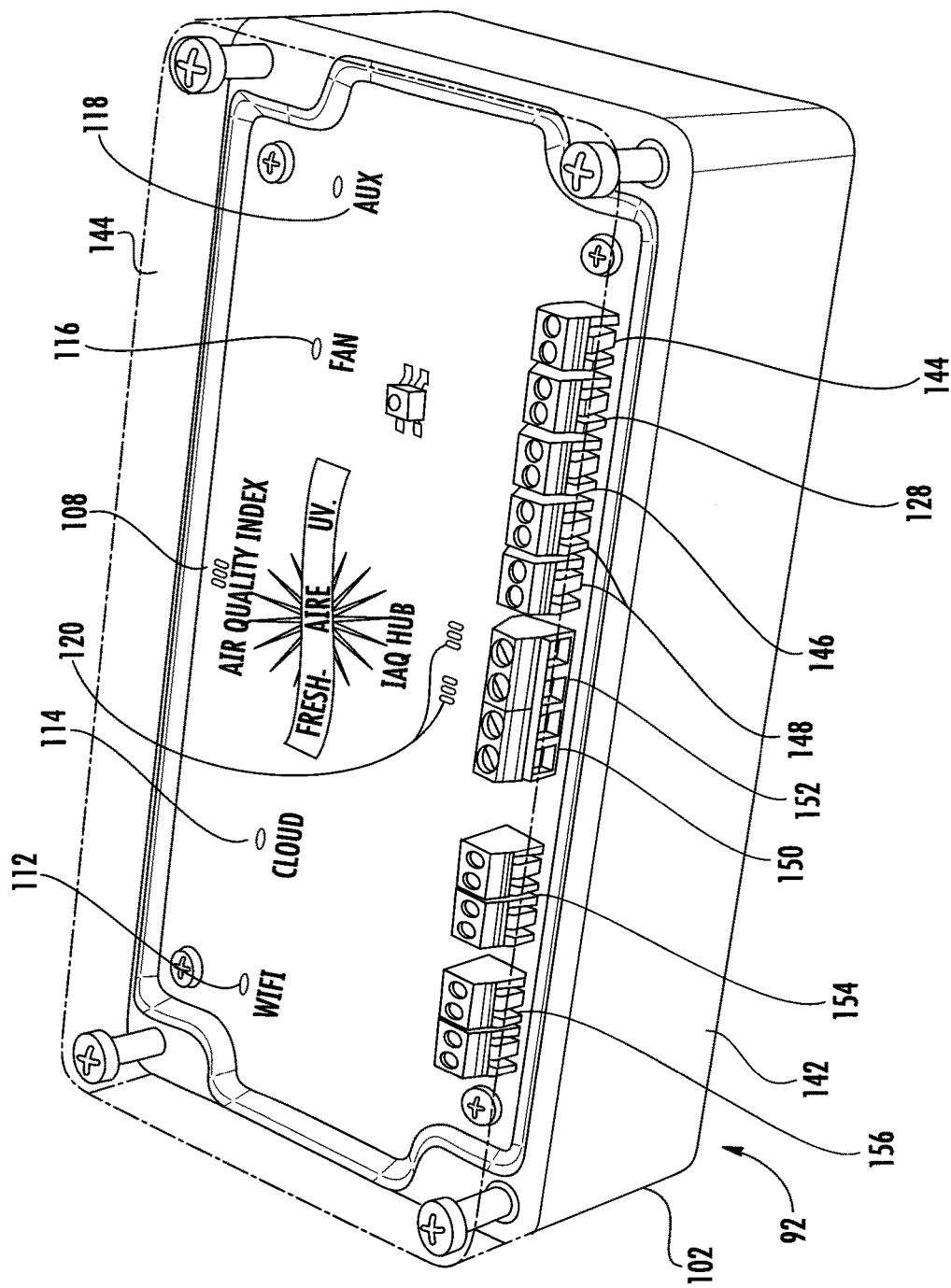
FIG. 13 is perspective view on an illustrative embodiment of an air quality management controller hub.
Figure 14:
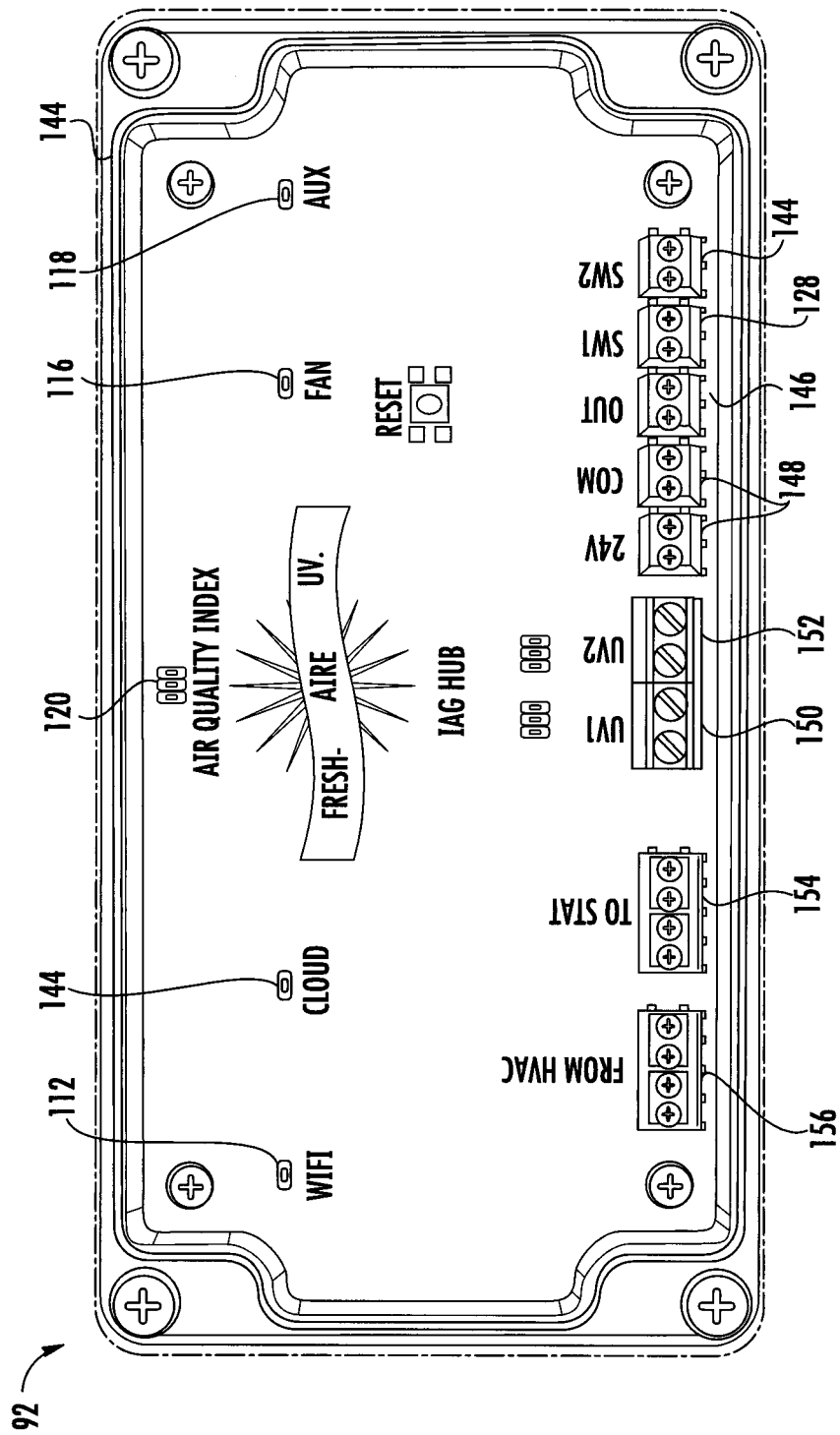
FIG. 14 is a top view of the air quality management controller hub illustrated in FIG. 13.

FIGS. 13 and 14 proud an illustrate embodiment of the hub 92, showing the housing 102 having an lower portion 142 and an upper portion 144. The hub 92 contains a plurality of relays, inputs, and LED indicators such as: on/of power input 142. HVAC overflow input 128, system status output relay 146 (hardware signal output to allow communication with external devices to show fault or other indications), power outlet relays 148, input 150 for non-light activated systems (17, FIG. 1) or input 152 for light activated air filtration systems (19, FIG. 1, and thermostat in input 154 or thermostat out inputs 156. Indicators include: wireless connection indicator 112, cloud connection indicator 114, air quality indicator 108, fan indicator 116, air exchanger control (AUX) status 118, and UV indicator 120

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An indoor air quality management system comprising:
   an air quality management controller comprising one or more sensors for measuring air quality or levels of air contaminants and being operatively connected to one or more components of a HVAC system which has or uses an ultraviolet light (UV) light source as part of a light activated air filtration system, said air quality management controller configured to monitor and interact with a HVAC system control unit based on threshold values set relating to air quality of or levels of contaminants in a predetermined area, said air quality management controller configured to control at least operation of said UV light source, determine or monitor life cycle or operational status of said UV light source, and to move air to interact with at least said light activated air filtration systems based on said monitoring of said predetermined area; said air quality management controller comprising a zero point crossing detector which detects when power is on or off operatively connected to and sending information to a central processing unit (CPU), said CPU configured to monitor said zero point detector information through an interrupt, wherein activity is stopped if a power stoppage is detected and the time of said power stoppage is recorded; said air quality management controller further configured to communicate alert levels or other information relating to one or more functions of said HVAC system or said air quality management controller to one or more electronic devices or networks; and at least one indoor air quality sensing unit containing one or more sensors for detecting various environmental factors associated with said predetermined area, said sensing unit independently positioned off said air quality management controller and in wireless communication with said air quality management controller.

2. The indoor air quality management system according to claim 1 wherein said air quality management controller is operatively connected to a HVAC fan or air exchanger.

3. The indoor air quality management system according to claim 2 wherein said connection is independent of HVAC cooling and heating functions.

4. The air quality management system according to claim 2 wherein said air quality management controller is operatively connected to said HVAC fan or air exchanger through a wireless connection.

5. The air quality management system according to claim 4 wherein said wireless connection is Wi-Fi, Bluetooth, Zigbee or SoW.

6. The air quality management system according to claim 2 wherein said air quality management controller is operatively connected to said HVAC fan or air exchanger through a wired connection.

7. The indoor air quality management system according to claim 1 wherein said at least one indoor quality sensor measures gas based air contaminants, organic chemicals or oxidant based contaminants.

8. The indoor air quality management system according to claim 1 wherein at least one indoor quality controller sensor or indoor air quality sensing unit sensor measures volatile organic compounds (VOCs) levels, particulate levels, and ozone levels.

9. The air quality management system according to claim 1 wherein said air quality management controller is configured to operate said HVAC fan or said air exchanger independently of a HVAC control unit when said at least one indoor quality controller sensor or indoor air quality sensing unit sensor detects a pre-determined level of one or more contaminants.

10. The air quality management system according to claim 1 wherein said air quality management controller is operatively connected to HVAC drain pan float switch.

11. The air quality management system according to claim 1 wherein said air quality management controller is configured to determine an amount of useful life of said UV light source associated with said HVAC system.

12. The air quality management system according to claim 1 wherein said air quality management controller is in wireless communication with said electronic device.

13. The air quality management according to claim 12 wherein said air quality management controller is configured to send one or more notifications to said electronic device via text, email, or through other data transfer networks.

14. The air quality management system according to claim 1 wherein said air quality management controller comprises one or more indicator lights.

15. An air quality management controller configured to interface with pre-existing HVAC hardware or electrical components to power a HVAC fan or air exchanger to an on position or an off position and for wireless connection to one or more electronic devices or air quality sensors, said air quality management controller comprising one or more sensors for measuring air quality or levels of air contaminants and being operatively connected to one or more components of a HVAC system which has or uses an ultraviolet light (UV) light source as part of a light activated air filtration system, said air quality management controller configured to monitor and interact with a HVAC system control unit based on threshold values set relating to air quality of or levels of containments in a predetermined area, said air quality management controller configured to control at least operation of said UV light source, determine or monitor life cycle or operational status of said UV light source, and to move air to interact with at least said light activated air filtration systems based on said monitoring of said predetermined area, said air quality management controller comprising a zero point crossing detector which detects when power is on or off operatively connected to and sending information to a central processing unit (CPU), said CPU configured to monitor said zero point detector information through an interrupt, wherein activity is stopped if a power stoppage is detected and the time of said power stoppage is recorded; said air quality management controller further configured to communicate alert levels or other information relating to one or more functions of said HVAC system or said air quality management controller to one or more electronic devices or networks.

16. The air quality management controller according to claim 15 wherein said air quality management controller is configured to send one or more notifications to an independent electronic device.

17. The air quality management controller according to claim 15 wherein said air quality management controller is operatively connected to a HVAC drain pan float switch.

18. The air quality management controller according to claim 17 wherein connection to said HVAC drain pan float switch is wireless.

19. The air quality management controller according to claim 15 wherein said air quality management controller is configured to determine an amount of useful life of a UV light associated with a HVAC system.

20. A method of managing indoor air quality within a predetermined area comprising:

monitoring a predetermined area for levels of air contaminates;

determining if said predetermined area is in need of air quality management based on detected levels of contaminants within said predetermined area;

using an air quality management controller interfaced with pre-existing HVAC hardware or electrical components to activate a HVAC fan or air exchanger independently of activation of a said HVAC fan or air exchanger through a HVAC control unit, said air quality management controller comprising one or more sensors for measuring air quality or levels of air contaminants and being operatively connected to one or more components of a HVAC system which has or uses an ultraviolet light (UV) light source as part of a light activated air filtration system, said air quality management controller configured to monitor and interact with a HVAC system control unit based on threshold values set relating to air quality of or levels of contaminants in a predetermined area, said air quality management controller configured to control at least operation of said UV light source, determine or monitor life cycle or operational status of said UV light source, and to move air to interact with at least said light activated air filtration systems based on said monitoring of said predetermined area, said air quality management controller comprising a zero point crossing detector which detects when power is on or off operatively connected to and sending information to a central processing unit (CPU), said CPU configured to monitor said zero point detector information through an interrupt, wherein activity is stopped if a power stoppage is detected and the time of said power stoppage is recorded; said air quality management controller further configured to communicate alert levels or other information relating to one or more functions of said HVAC system or said air quality management controller to one or more electronic devices or networks.

21. The method of managing indoor air quality within a predetermined area according to claim 20 further including the step of monitoring a status of a HVAC drain pan float switch.

22. The method of managing indoor air quality within a predetermined area according to claim 20 further including the step of determining an amount of useful life of a UV light associated with a HVAC system.

* * * * *